United States Patent [19]
Bhave et al.

[11] Patent Number: 5,645,727
[45] Date of Patent: *Jul. 8, 1997

[54] ON-LINE OZONATION IN ULTRA PURE WATER MEMBRANE FILTRATION

[75] Inventors: Ramesh R. Bhave, Cranberry Township; James L. Filson, Wexford, both of Pa.

[73] Assignee: Illinois Water Treatment, Inc., Warrendale, Pa.

[ * ] Notice: The term of this patent shall not extend beyond the expiration date of Pat. No. 5,518,624.

[21] Appl. No.: 648,919

[22] Filed: May 16, 1996

Related U.S. Application Data

[63] Continuation-in-part of Ser. No. 239,218, May 6, 1994, Pat. No. 5,518,624.

[51] Int. Cl.$^6$ .................................................. B01D 61/00
[52] U.S. Cl. .......................... 210/651; 210/636; 210/650; 210/653; 210/900; 210/760
[58] Field of Search .......................... 210/636, 651, 210/760, 900, 650, 652, 500.26, 653, 668

[56] References Cited

U.S. PATENT DOCUMENTS

| | | | |
|---|---|---|---|
| 4,548,716 | 10/1985 | Boeve | 210/652 |
| 5,006,248 | 4/1991 | Anderson et al. | 210/500.26 |
| 5,073,268 | 12/1991 | Saito et al. | 210/760 |
| 5,104,546 | 4/1992 | Filson et al. | 210/650 |
| 5,205,937 | 4/1993 | Bhare et al. | 210/652 |
| 5,242,595 | 9/1993 | MoGart et al. | 210/636 |
| 5,250,184 | 10/1993 | Maier | 210/500.26 |
| 5,433,866 | 7/1995 | Hoppe et al. | 210/760 |
| 5,447,640 | 9/1995 | Omi et al. | 210/760 |
| 5,512,178 | 4/1996 | Dempo | 210/760 |
| 5,518,624 | 5/1996 | Filson et al. | 210/651 |
| 5,531,893 | 7/1996 | Hu et al. | 210/500.35 |
| 5,554,295 | 9/1996 | Bam et al. | 210/668 |

FOREIGN PATENT DOCUMENTS

| | | | |
|---|---|---|---|
| 006681 | 6/1977 | Japan | 210/636 |

OTHER PUBLICATIONS

"Multi-technology Water Systems," Manufacturing Chemist, pp. 23–25, Mar., 1994.
"Filtering Out the Facts of Crossflow," Manufacturing Chemist, pp. 27 et seq., Mar. 1994.
Andrews, Steve, "A Look into the Future of Ozone," Water Conditioning & Purification, pp. 38–42, Mar. 1991.
"Filtratrion Ozone Compatability of an All–PVDF Di Water Ultrafilter, Ultrapure Water", pp. 38–42, Mar. 1991.
"Ozonation," Handbook of Water Purification, Chapter 15, 1987.
Venoza et al., "Comparative Efficiencies of Ozone Utililization and Microorganism Reduction in Different Ozone Contactors", Progress in Wastewater Disinfection Technology, Sep. 18–20, 1978.

Primary Examiner—Ana Fortuna
Attorney, Agent, or Firm—Douglas G. Glantz

[57] ABSTRACT

Particle filtration of a feed of highly corrosive ultra pure water and contaminants is disclosed through a metal oxide membrane on ceramic support in combination with on-line ozonation. In one aspect, the filtering of ultra pure water includes passing the feed cross-flow through a multichannel sintered monolithic metal oxide membrane on ceramic support to form a permeate of particle-free ultra pure water. Although high recoveries per pass rates were used, no detectable metal ions including aluminum, zirconium, or yttrium ions were found in the ultra pure water permeate. The apparatus and process of the present invention for filtering ultra pure water include cross-flow filtration using multichannel monolithic ceramic membranes at suitable pore sizes in a total chemical process system including elevated temperatures and on-line ozonation sterilization of the ceramic membrane particle filter in high purity water applications for electronics manufacturing.

20 Claims, 5 Drawing Sheets

FIG. 2    "Prior Art"

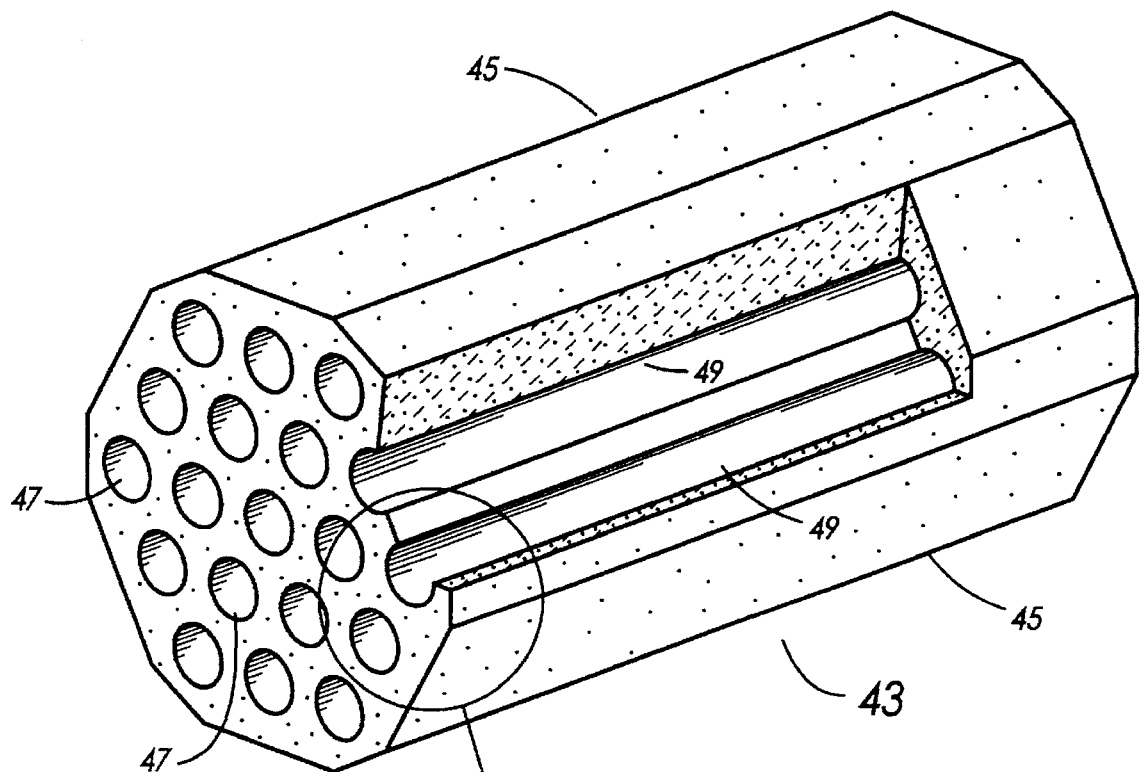
FIG. 4
"Prior Art"
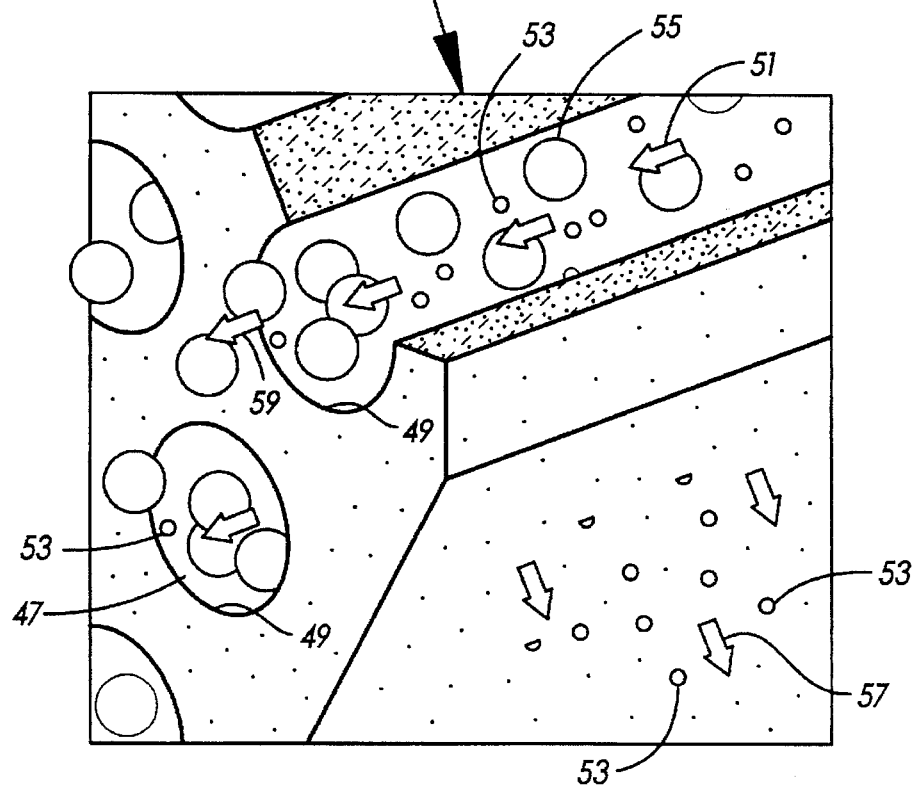

ON-LINE OZONATION IN ULTRA PURE WATER MEMBRANE FILTRATION

This application is a continuation-in-part of prior, U.S. patent application Ser. No. 08/239,218 filed May 6, 1994 now U.S. Pat. No. 5,518,624.

BACKGROUND OF THE INVENTION

1. Technical Field

This invention relates to novel apparatus and process for continuous or on-line ozonation in ultra pure water membrane filtration. In one aspect, the invention relates to a separations process for continuous or on-line ozonation in providing particle-free ultra pure water by membrane filtration for use in the electronics and semiconductor industries.

2. Background

High purity water is required for semiconductor device manufacturing. In semiconductor manufacturing, high purity water is used primarily for wafer rinsing. This rinsing process removes both contaminants inadvertently introduced to the wafer during the manufacturing process as well as chemicals intentionally introduced to the wafer for the purpose either of cleaning or of etching patterns into the semiconductor surface or the conductive or dielectric thin films grown or deposited on this surface as required to produce a semiconductor device.

These cleaning or etching chemicals include, but are not limited to ammonium fluoride, piranha solutions (the generic name used for mixtures of sulfuric acid and a strong oxidizer: usually hydrogen peroxide or ozone), and the two component solutions comprising the industry standard RCA cleaning method, i.e., the so-called SC-1 and SC-2 solutions. (W. Kern and D. A. Puotinen, *RCA Review*, Volume 31, pp. 187, 1970.) SC-1 is a mixture of ammonium hydroxide, unstabilized hydrogen peroxide, and ultra pure water. SC-2 is a mixture of hydrochloric acid, unstabilized hydrogen peroxide, and ultra pure water.

Ultra pure water rinses are also used to remove the solvents used for the removal of photoresists.

Ultra pure water is the chemical used in the greatest quantity in semiconductor manufacturing, and extremely large quantities of ultra pure water are produced in modern semiconductor production facilities.

The greatest cause of yield loss in modern semiconductor manufacturing is particulate contamination. Particles interrupt the photolithographic patterns that define integrated circuit components and can cause open circuits in the conductive metal thin films that wire these circuits together. When attached to a semiconductor wafer, particles are extremely difficult to remove as they electrostatically bond to the wafer. Therefore, all of the fluids which contact the semiconductor wafer must be rigorously filtered to remove particles. This includes ultra pure water.

Conventional processes for producing ultra pure water typically use dead-end filtration with polymeric membranes. For example, conventional ultrafilters (similar in design to RO membrane systems) are used to produce high purity water for electronics applications. Spiral wound membranes, another commonly employed technology, require low solids in the feed stream and have high pressure drops associated with the restrictive liquid flow paths through their extremely narrow channels. The fouling of polymeric ultrafilters is a problem as is the requirement to periodically clean these filters off line. (D. Sinha, "Pretreatment Process Considerations for the Semiconductor Industry", *Ultrapure Water* 7(6), pp. 21–30 (1990).)

These and other known processes for producing ultra pure water for the electronics or semiconductor manufacturing applications are represented in the following.

U.S. Pat. No. 5,292,439, assigned to Mitsubishi Kasei of Japan, discloses a method for preparing ultra pure water for use in electronics industries. The patent discloses that the water quality of ultra pure water is largely affected by impurities eluted from the materials constituting the purification apparatus. (Col. 1, bottom). An improved ion exchange process is provided to overcome the problems of the impurities eluted from the materials constituting the purification apparatus.

U.S. Pat. No. 5,259,972, assigned to Nippon Rensui and Mitsubishi Denki of Japan, discloses apparatus and method for purifying water for use in the electronics industry. The patent discloses that it is known to combine an ultrafilter membrane with ion exchange, ultraviolet (UV) sterilizers, cartridge filters, reverse osmosis (RO) and other components to produce ultra pure water. (Col. 1, line 18).

U.S. Pat. No. 5,160,429, assigned to Tadahiro Ohmi of Japan, discloses supplying ultra pure water for the electronic industry. The patent shows the use of ultrafiltration units 108 and 109.

U.S. Pat. No. 5,128,043 discloses apparatus and method for purifying water for use in the electronic industry. The patent discloses using an electric field. A specific object is to remove particles. Another object is to provide a method and apparatus not affected by ozone. A membrane filter 4 removes particulates. A final filter 12 is sized at 0.2 microns.

U.S. Pat. No. 5,124,033, assigned to Shinko Pantec of Japan, discloses an ultra pure water producing system for the semiconductor manufacturing process. Metallic ions and particulates are removed. An ultrafilter 39 is disclosed. The patent discloses that when water comes in contact with the materials of the devices and pipings, materials such as silica are leached out.

U.S. Pat. No. 5,073,268, assigned to Ebara Corp. of Japan, discloses a process for purifying water or ultra pure water for use in the electronics industry. An ultrafilter unit 22 is disclosed.

U.S. Pat. No. 5,061,374, assigned to Micron Technology of Boise, Id., discloses an ultra pure water system employing a second train which reduces particulate in the manufacture of integrated chips (IC's). The patent discloses ozone and membrane filters and reduces particulate in the water to a level of less than 30 counts per milliliter sizes 0.1 micron to 1 micron. (Col. 1, lines 48–50.)

U.S. Pat. No. 5,024,766 discloses water purification which reduces particulate in semiconductor manufacturing. The patent discloses ozone and submicron filter 20. Polymeric membrane filters marketed as Fluorodyne are disclosed at the top of Col. 9.

U.S. Pat. No. 4,879,041, assigned to Hitachi of Japan, discloses a process for producing ultra pure water for semiconductor manufacturing. The patent discloses ozone and membrane filters.

U.S. Pat. No. 4,863,608, assigned to Nomura Micro Science of Japan, discloses a process for producing ultra pure water for integrated circuits manufacturing. The patent discloses ultrafiltration and microfiltration.

INTRODUCTION TO THE INVENTION

High purity water is very corrosive. It has been described as "hungry water," a characterization of its high corrosivity.

The presence of minerals in normal water provides a microscopic deposition of protective surface coatings. These coatings serve to shield such areas from further corrosive contact with the water. Deionization removes the minerals that offer such mediating interfaces and exposes the metal to relentless corrosive attack by the ultrapure water which is aggressive and unremitting.

The aggressiveness of high purity water upon surface materials causes problems in particle exclusion filtration processes. The problems involve shedding of materials of filter construction into the water stream, contribution of ionic species to the filtered water, and introduction of TOC (Total Oxidizable Carbon or Total Organic Carbon) to the water stream.

Ozone, chlorine, or hydrogen peroxide enable the destruction of microbial matter such as bacteria and viruses, which are present and form the primary source of TOC. But additional chemical agents such as chlorine or hydrogen peroxide are themselves considered to cause the introduction of undesirable contaminants in ultra pure water.

The aggressiveness of ozone, however, on membrane surface materials causes problems in particle exclusion membrane filtration processes.

Hot ultra pure water (UPW) has become desirable for semiconductor wafer rinsing as the diffusive removal of chemicals from solids is accelerated by heat, the diffusion process being temperature dependent. Additionally, most substances (although not all) are more readily soluble in hot water than in cold. The superior cleansing properties of hot UPW are perceived to extend as well to the removal of particles from the wafer surfaces. Currently used ultrafilters are incompatible with hot UPW. (M. S. Homick, K. L. Fulford, and S. Browne, "Design and Performance of a Central Hot Ultrapure Water System", *Proceedings of the 1992 Microcontamination Conference*, pp. 753–763, 1992.)

There are many costly problems and drawbacks associated with the utilization of conventional loop or final filters in the conventional or prior art processes or methods for producing ultra pure water.

One problem involves using ozone sterilization. If ozone is present, none of the conventional polymeric membranes are resistant with the exception of polytetrafluoroethylene (PTFE).

Ozone causes the oxidation and therefore growth of a polymeric filter's pore size resulting in lower particle retention levels with increasing exposure to ozone.

Another problem involves using high temperatures. If high temperature operation is required, organic extractables and short to non-existent membrane life become problems for many polymeric membranes.

A further drawback is the failure of the filter media surfaces or opening of the filter pores because of oxidation of non-resistant organic materials in the presence of strong oxidizing agents such as ozone.

Another drawback is the failure of welded polymer seams along the filter pleat.

A further drawback is the requirement of high flux or throughput for economic viability.

Another drawback is that ozone-resistant organic materials suffer from low flux because of low permeation, permeability characteristics.

The conventional methods utilize an organic copolymer membrane. Therefore, another drawback in dealing with such materials is that the oxidizing environment will degrade or produce organic impurities which raise TOC levels.

It is also a drawback of conventional methods in the requirement for a separate sterilizing agent because of non-compatibility with ozone, which is the current sterilizing agent of choice in the electronics industry.

A new ultra pure water filter is needed which would provide excellent particle removal efficiency and further would provide quick rinse up, no shedding of its materials of construction into the water stream, no contribution of ionic species, and minimal introduction of TOC (Total Oxidizable Carbon or Total Organic Carbon) to the water stream.

A new ultra pure water filter is needed which would provide ozone compatibility.

A new ultra pure water filter is needed which would provide high temperature compatibility with hot ultra pure water (UPW).

Therefore, it is an object of the present invention to provide a stable, high flux ultrafiltration membrane for filtering ultra pure water.

It is another object of the present invention to provide a process for filtering particles from ultra pure water for use in electronics manufacturing.

It is a further object of the present invention to provide a process for filtering ultra pure water through an ultrafilter in hot, ozonated high purity water with no detectable metal extractables.

It is still a further object of the present invention to provide a process for filtering ultra pure water through a filter which passes toxicology tests to provide for use in food and pharmaceutical applications.

It is still a further object of the present invention to provide a process for filtering ultra pure water through a filter with no particle shedding.

It is still a further object of the present invention to provide a process for filtering ultra pure water through a filter which provides long membrane life and an economical and compact design.

It is still a further object of the present invention to provide a process for filtering ultra pure water through a filter providing a metal oxide membrane on a ceramic support which is able to withstand prolonged contact with ozone and high temperatures.

It is another object of the present invention to provide a process for filtering ultra pure water through a filter providing a metal oxide membrane on a ceramic support which does not alter ultra pure water properties, e.g., without leaching ions into the ultra pure water.

It is another object of the present invention to provide a process for filtering ultra pure water through a filter providing a metal oxide membrane on a ceramic support which maintains acceptable ultra purity filtration without leaching ions into the ultra pure water produced over high recoveries per pass, which result in longer times of water contact with the filter.

It is a further object of the present invention to provide a process for filtering ultra pure water through a filter which can be maintained and returned to operable condition by sterilizing with ozone or cleaning with steam, acid, and/or basic solutions.

A further object of the present invention is to provide a process for filtering ultra pure water through a filter which is integrity testable and bacteria and pyrogen retentive while providing acceptable flux and permeability, i.e., flux per unit transmembrane pressure, over a wide range of operating conditions.

It is yet another object of the present invention to provide a membrane filter which is insensitive to sudden process upsets such as high pressure or temperature or both.

Another further object of the present invention is to provide a filter which can be back-pulsed with clean water flux to dislodge and remove contaminated trapped by the membrane layer.

These and other objects of the present invention will be described in the detailed description of the invention which follows. These and other objects of the present invention will become apparent to those skilled in the art from a careful review of the detailed description and from reference to the figures of the drawings.

SUMMARY OF THE INVENTION

The present invention provides for filtration of particle contaminants from ultra pure water by passing through a metal oxide membrane on ceramic support in combination with on-line ozonation. In one aspect, the process of the present invention provides for the filtering of ultra pure water by passing a feed solution cross-flow through a multichannel sintered monolithic metal oxide membrane on ceramic support to form a permeate of particle-free ultra pure water at an elevated temperature above about 80° C., preferably above about 90° C. In one aspect, the sintered metal oxide membrane provides a nominal pore size in the range of about 50 to 500 Angstroms, preferably less than about 200 Angstroms.

In one aspect, the present invention includes providing cross-flow particle filtration, using multichannel monolithic ceramic membranes, at about 50–200 Angstroms pore sizes, in a total chemical process system including on-line ozonation sterilization of the ceramic particle filter and the ability to operate continuously at elevated temperatures, e.g., above about 90° C. in water purification applications for electronics manufacturing.

BRIEF DESCRIPTION OF THE DRAWINGS

FIG. 4 shows a schematic representation of a multichannel monolithic cross-flow membrane on ceramic support in accordance with the present invention and includes a detailed view of a section of the membrane on ceramic support.

DETAILED DESCRIPTION

Figure 1:
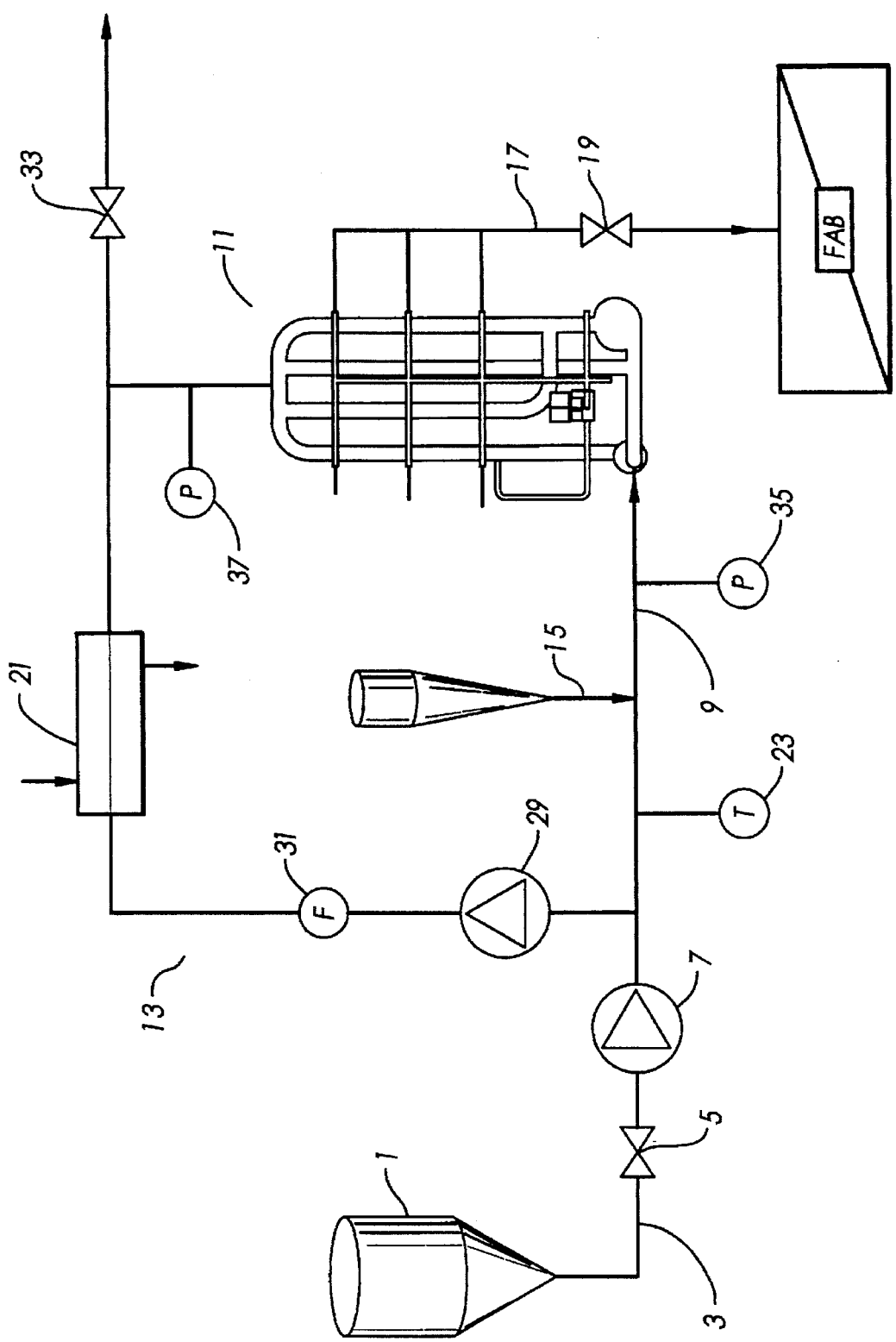
FIG. 1 is a process schematic diagram of a system for filtering ultra pure water in combination with on-line ozonation in accordance with the present invention.

Referring now to FIG. 1, a process schematic diagram is shown of the system for filtering ultra pure water in combination with on-line ozonation in accordance with the present invention.

As shown in FIG. 1, an ultra pure water feed from feed tank 1 is passed in line 3 to three way valve 5 and pump 7, then through line 9 to ceramic membrane module 11. Ceramic membrane module 11 provides for filtering the ultra pure water feed in combination with on-line ozonation. Ozone is introduced into the recirculation loop 13 in line 15. Prior to on-line ozonation, three-way valve 5 is by-passed so that no new feed from feed tank 1 in line 3 is introduced into the recycle loop 13.

Ozone is introduced at 15 into recycle loop 13 so that ozone concentration is adjusted and controlled to the desired level not to be less than 1 ppm on the downstream side of the loop 13.

On the downstream side of loop 13, permeate in line 17 is passed from ceramic membrane module 11 through permeate outlet valve 19 to the point of use.

On-line ozonation reciculation is performed for a short period, e.g., 10 minutes to 30 minutes at an elevated temperature, e.g., 90° C. using in-line heat exchanger 21 and temperature gauge 23. Subsequently, permeate valve 19 is partially opened to allow permeate to flow out. Ozone concentration in the permeate is monitored and controlled. When it is confirmed that the ozone concentration is above the minimum desirable level, e.g., 1 ppm, permeate valve 19 is closed. The recycle loop can be drained and the filtering process resumed.

The process of the present invention is applied also to continuous on-line ozonation in addition to batch ozonation applications. In a continuous on-line ozonation, valve 5 would be controllably opened to pass feed to the recycle loop in combination with on-line ozonation addition at 15. The filtering process pressure is monitored and controlled using pressure gauges 35 and 37, circulation pump 29, electromagnetic flow meter 31, and retentate outlet valve 33.

The present invention includes removing particles from high purity water for use in electronics applications using multichannel monolithic cross-flow ceramic membranes. It has been found through empirical testing that the advantages of using multichannel monolithic 200Å ceramic membranes in this cross-flow filtration include an ability to run hot and to put ozone in the ceramic membrane filter for particle purification purposes. An unexpected result was observed in complete particle rejection and no leaching of the membrane element.

The ceramic membrane ultrafilter's particle retentive characteristics of the present invention, because of its rigid construction, are unaffected by pressure pulses. This rigid construction, unaffected by pressure pulses, provides a definitive advantage in the ultra pure water application of the present invention.

Prior to the demonstration of this technology, it was believed that significant particle counts could be removed, but that the resulting product stream would contain ions formed from leaching out of aluminum.

It was found from work conducted by an independent analytical laboratory that the product water stream contained acceptable TOC, together with high particle removal. The independent analytical laboratory can detect aluminum at 0.007 parts per trillion, and none was observed at or above this detection limit.

The demonstration was unexpected and surprising in the result of no aluminum leaching because aluminum or alumina in contact with water will leach out aluminum ions at least in the parts per billion range. Such leaching is particularly expected in the case of ultra pure water. Although not certain, it may be that the mechanism operating here is attributable to the sintered nature of the membrane.

The novel filtration technology of the present invention is run with very high recoveries per pass such that water is in contact with the ceramic membrane over a high residence time. This aspect of the process makes the unexpected result of no leaching of the ceramic membrane elements even more surprising.

The on-line ozone of the present invention enables the destruction of microbial matter. Microbial matter, such as bacteria and viruses, is the primary source of TOC without the introduction of additional chemical agents such as chlorine or hydrogen peroxide which are themselves considered contaminants in ultra pure water.

Ozone is produced by spark discharge from ultra pure oxygen and eventually decomposes into diatomic oxygen in ultra pure water. It therefore offers an extremely clean method of system sterilization. This ability of ozone to kill biological contaminants on line is especially critical for ultra pure water systems as bacteria and microorganisms can grow rapidly in the conditions commonly found in ultra pure water distribution loops.

The above-described characteristics are desirable for all of the various types of filters typically used in ultra pure water systems: microfilters, tangential-flow or cross-flow filters such as ultra filters, and RO (reverse-osmosis) membranes.

On-line ozone in accordance with the present invention can be utilized in an ultra pure water system in various ways. It can be used for initial sterilization of a system after construction. It can be used periodically afterward for continuous re-sterilization before or after system component replacement or maintenance, or it can be used continuously in the feed.

Hot ultra pure water (UPW) is highly beneficial for the semiconductor wafer rinsing as the diffusive removal of chemicals from solids is accelerated by heat, the diffusion process being temperature dependent. Additionally, most substances (although not all) are more readily soluble in hot water than in cold. The superior cleansing properties of hot UPW are perceived to extend as well to the removal of particles from the wafer surfaces. Currently used ultrafilters are incompatible with hot UPW. (M. S. Homick, K. L. Fulford, and S. Browne, "Design and Performance of a Central Hot Ultrapure Water System", *Proceedings of the 1992 Microcontamination Conference*, pp. 753–763, 1992.) The ceramic membrane ultrafilter of the present invention, on the other hand, was observed to be unaffected by hot UPW with or without ozone injection.

The ceramic membrane ultrafilter's pore size was found to be unaffected by ozone independent of ozone concentration or length of exposure.

Conventional methods such as polymeric membrane ultrafiltration are less suitable because they cannot function in aggressive, higher temperature and extreme pH regimes. Polymeric ultrafiltration membranes are difficult to clean. The ceramic membrane ultrafilter disclosed in detail herein is far less susceptible to fouling by dissolved solids and can by cleaned dynamically during use without system shutdown by a technique know as back-pulsing.

Polymeric ultrafiltration membranes provide only relatively low fluxes, I.e., low permeation rates per unit of filtering. Polymeric ultrafiltration membranes can not be back-pulsed at high pressures. Back-pulsing is the periodic application of counter pressure on the permeate side of the membrane element to push back a given permeate volume into the feed side of the membrane element to disrupt or destroy the gel layer or particle deposits on the membrane surface.

The different components used in conventional UPW (ultra pure water) systems have unacceptable levels of compatibility with ozone and hot UPW. Final filters used to produce ultra pure water are not compatible with ozone. Therefore, conventional final filters used to produce ultra pure water today must be taken out, or "valved out," of the loop during ozone sterilization. These conventional filters typically are sterilized separately with hot UPW or chemical solutions. Addressing final filters separately during frantic plant shutdowns creates extra work, thus increasing the length and cost of the shut-down. In many cases, ozone sterilization of the service loop will take place without the final filters on line. This situation invites particulate contamination of the service loop. Alternatively, hot ultra pure water sterilization, which is ideal from the standpoint of cleanliness, requires significant extra effort and equipment during the filter sterilization, and hot UPW may also attack the materials of construction of these final filters. Commonly used chemical oxidizing agents, such as hydrogen peroxide, have undesirable drawbacks associated with contamination and rinse up problems.

The filter requirements of the present invention include resistance to particle release because of pressure fluctuations. Filter design is an important factor in determining the particle shedding characteristics of ultrafilters in both normal and pulsed conditions. Many types of filters including ultrafilters will shed particles or pass trapped particles when the feed pressure pulsates. (Meltzler, T. H., "An Investigation of Membrane Cartridge Shedding: A Quantitative Comparison of Four Competitive Filters", *Transcripts of Sixth Annual Semiconductor Pure Water Conference*, pp. 221–239, Santa Clara, Calif., Jan. 15–16, 1987.)

We have found empirically that the process of the present invention provides an efficient and effective process for filtering ultra pure water. The metal oxide membrane on ceramic support substantially removes particles from the water. We also have observed that the apparatus and process of the present invention provide advantages of filtering out contaminants while undesirable metal ions are not leached out into the ultra pure water product stream. Accordingly, we have developed practical and efficient filtration apparatus and method for filtering ultra pure water for use in electronics manufacturing and for cleaning the filter for repeated use. The apparatus and process of the present invention provide consistently high quality, particle-free ultra pure water.

The ultra pure water as produced in the apparatus and method of the present invention includes ultra pure water as referred to in electronics manufacturing as defined by the standards of Balazs Analytical Laboratory's Pure Water Specifications and Guidelines, 1993.

As used herein, the term "contaminants" include, either singly or in mixtures, ions, colloids, particles, and organic compounds, both dissolved or suspended. Also included in this term are materials which are impurities detected in the process fluid.

In one aspect of the process of the present invention, the membranes on ceramic support are chemically cleaned and can retain essential filtering characteristics even after ozone sterilization or aggressive, extreme pH cleaning in strongly acid or alkaline solutions.

Figure 2:
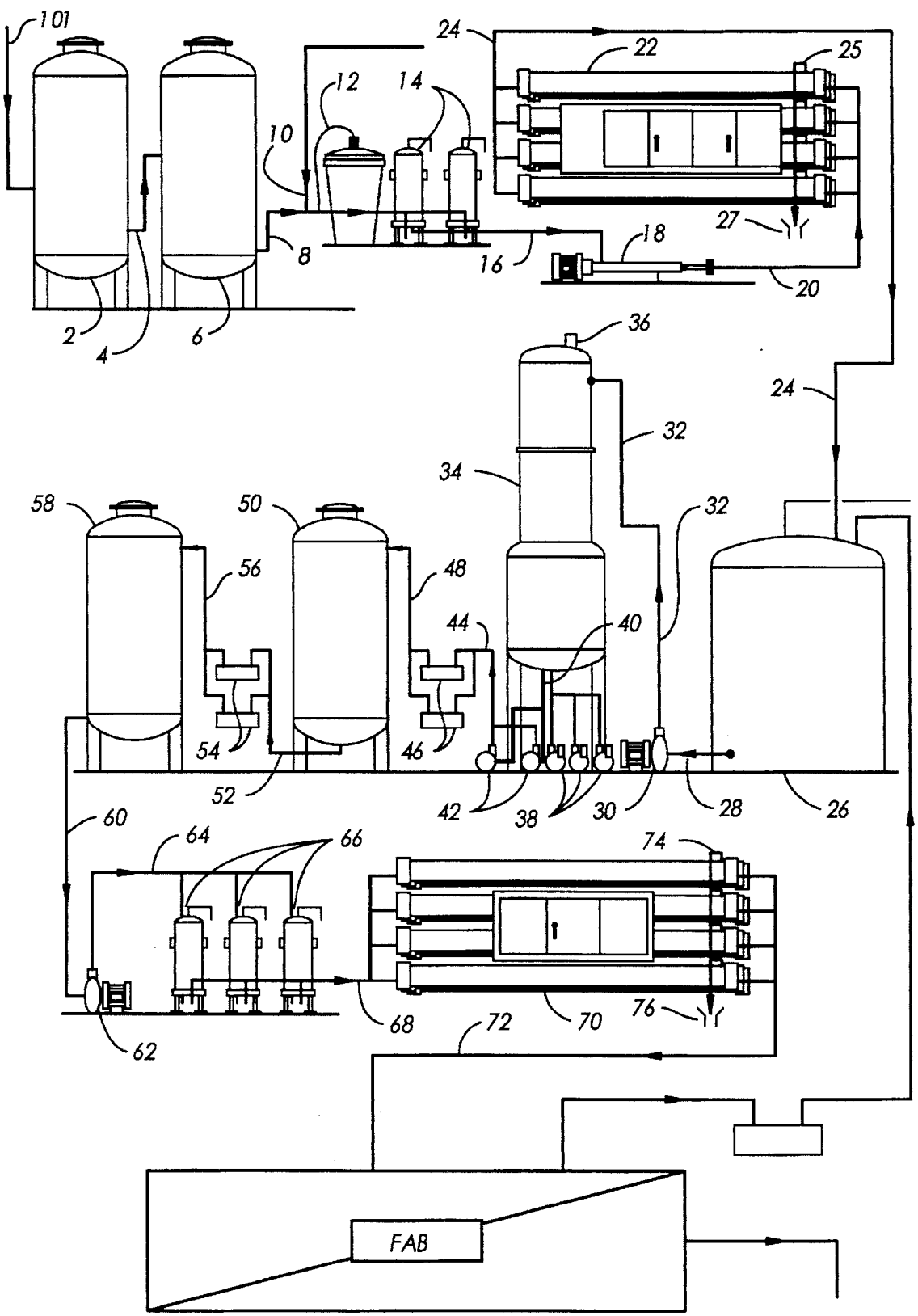
FIG. 2 is a process schematic diagram of a system for generating ultra pure water as used in the "prior art."

Referring now to FIG. 2, a representative system for generating ultra pure water as used in the "prior art" will be described. Referring to FIG. 2, a typical ultrapure water production facility is shown incorporating common, conventional treatment technology. Municipal water in feed stream 101 enters multimedia filter 2. Multimedia filter 2 is designed to remove suspended solids present in the feed stream water supply. Water from multimedia filter 2 is passed in stream 4 to activated carbon filter 6 designed to remove oxidizing agents and organic compounds. Water from activated carbon filter 6 exits in stream 8. Acid in line 10 is introduced into stream 8 for pH control. An antiscalant in line 12 is added for scale control. Water is then passed to prefilter system 14. Prefilter system 14 is designed to remove suspended solids present in the feed water supply and to act as a polishing filter to the multimedia filter 2.

Water from prefilter system 14 is passed in line 16 to reverse osmosis booster pump 18, which increases feed water pressure by about 200–300 psig. Water at boosted pressure is passed through line 20 to reverse osmosis system 22. Reverse osmosis system 22 is designed to remove suspended and dissolved solids by more than about a 95% reduction. Reverse osmosis product water is removed in line 24 and fed to storage tank 26. By design, the percentage of reverse osmosis feed water, i.e., the feed to reverse osmosis system 22 which does not become reverse osmosis product water is termed the "concentrate" and exits reverse osmosis system 22 as waste through line 25 to drain 27.

Water from storage tank 26 in line 28 is supplied to repressurization pump 30, which increases water pressure by about 100–150 psig. Repressurized water in line 32 is fed to vacuum degasifier system 34. Vacuum degasifier 34 is designed to remove dissolved or entrained gasses through line 36 and vacuum pump 38. Water from vacuum degasifier 34 is passed in line 40 to enter repressurization pump 42, which increases water pressure by about 100–150 psig.

Repressurized water in line 44 is fed to ultraviolet system 46. Ultraviolet system 46 is designed to reduce the total amount of organic contaminants. Water from ultraviolet system 46 is fed in line 48 to primary mixed bed deionizer 50 which is designed to remove dissolved ions.

Water then is passed in line 52 to ultraviolet system 54 designed to reduce the total amount of bacteria or microorganisms. Water then is passed in line 56 to final polishing deionizer 58 which is designed to remove any ionic contamination not removed by primary deionizer 50.

Water from final polishing deionizer 58 is passed in line 60 to loop booster pump 62 which boosts water pressure by 100–150 psig. Boosted pressure water in line 64 enters ultrafilter prefilter 66. Water then is passed in line 68 to prior art ultrafilter 70 which is designed to remove suspended solids. The ultrafilter product water in line 72 is supplied to points of use. By design, the percentage of ultrafilter water which does not become ultrafilter product water is termed "reject," and exits the prior art ultrafiltration system 70 as waste through line 74 to drain 76.

In the prior art process, the ultrapure water containing contaminants is introduced into a polymeric membrane system in line 68. The ultrapure water containing contaminants is introduced into an element pressure vessel 70 containing the polymeric membrane (not shown). Water flows across the surface of the membrane cross-flow. The polymeric membrane uses an envelope design with three sealed sides and the fourth side attached to a product tube (not shown). This design renders the membrane system susceptible to irreversible damage caused by back pressure or sudden back-pulses. Water passing through the membrane is termed flux, permeate, or product. Permeate flows from the membrane and is collected in the product tube and exits the pressure vessel 70 in line 74. Water, by design, not permeating through the membrane is termed concentrate, retentate, or waste. Waste exits the pressure vessel 70 in line 72 where it goes to drain or to some reuse program. This system is operated as a feed and bleed system. It has a maximum temperature limit of 50 degrees C, a pH range from 2–13, limited resistance to some oxidizing agents with no resistance to ozone, and limited resistance to back pressure/pulses.

Figure 3:
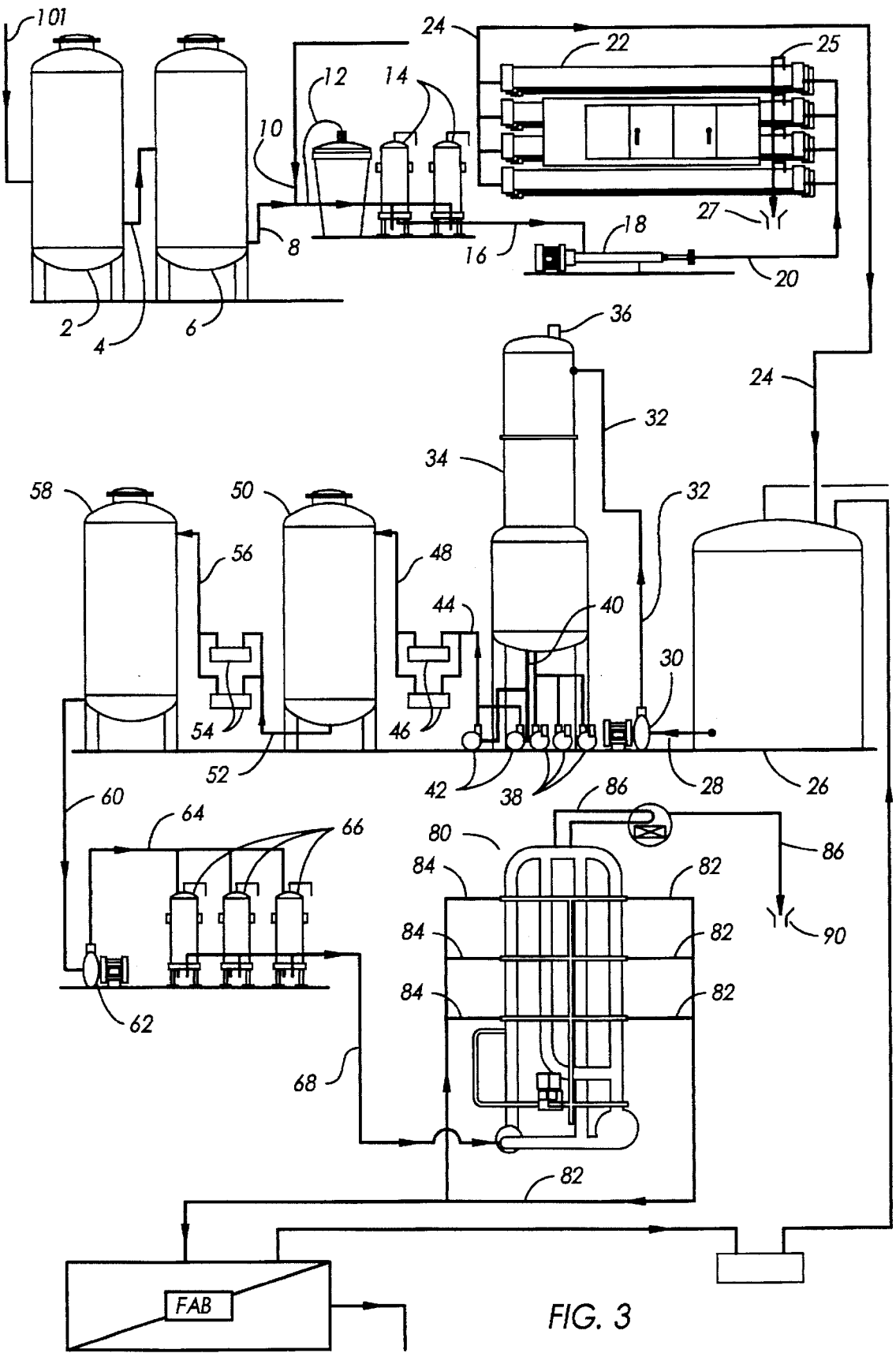
FIG. 3 is a process schematic diagram of a system for filtering ultra pure water in accordance with the present invention.

Referring now to FIG. 3, the present invention provides particle filtration of water in line 68 fed to module 80 containing a ceramic element having a metal oxide membrane. Water in stream 82 exits module 80 and is supplied as particle-free ultra pure water to points of use. Clean water supply in line 84 is used to carry out the back-pulsing mode described in detail hereinbelow. By design, the percentage of the feed water which does not become product water is termed "retentate" and exits through line 86 as waste and goes to drain 90.

The membrane housing or module includes an annular housing, preferably of stainless steel or other suitable housing materials, such as polyvinylidenedifluoride or titania, for the ultra pure water application, which contains at least one longitudinal ceramic element mounted therein. As will be explained further hereinafter with respect to FIG. 4, the ceramic element includes a metal oxide membrane on ceramic support. Any number of ceramic elements can be contained in a module, up to 37 as used in accordance with the present invention.

The ultra pure water containing contaminants is introduced into the ceramic membrane system in line 68. The feed water enters the module housing 80 and flows across the surface of the membrane in a cross-flow pattern. The ceramic membrane utilizes a multi-channel element with the membrane sintered to a support matrix which is shown and described in more detail hereinbelow. The membrane of the present invention allows the membrane system to be back-pulsed with clean water flux to dislodge and remove contamination trapped by the membrane gel layer. Water passing through the membrane is termed flux, permeate, or product. Permeate flows from the membrane and through the support matrix and is collected within the confines of the housing and exits in line 82. Water, by design, not permeating through the membrane is termed concentrate, retentate, or waste. Waste exits the pressure vessel 80 in line 86 and goes to drain 90 or to some reuse program. During the back-pulse sequence of operation, permeate from line 82 is supplied to line 84 in order to dislodge and remove contamination trapped by the membrane gel layer and is rinsed from the element through line 86 where it goes to drain 90 or to a reuse program. The present invention has been structured and operated as a feed and bleed system.

As will be explained in further detail with respect to FIG. 4, a cross-flow or tangential flow filtration process is established. The feed stream enters the element at a feed side of the element. The feed stream minus settled contaminants moves across or parallel to the membrane of the ceramic element while removing permeate solution tangentially through the element. The permeate is transported away from the module 80 containing the ceramic membrane element via a permeate outlet and through permeate line 82 into a permeate collection tank. The permeate fed in line 82 is particle-free ultra pure water. Ultra pure water fed in line 82 then can be used in the electronics fabrication (FAB) manufacturing operations or processes.

Flowing in the retentate side of the module 80 is the concentrate where contaminants are retained. The retentate will flow from the retentate output side of the module into output line 86 and into a recycle reservoir for a batch mode process with total recycle. A continuous process termed feed and bleed method can be operated where a predetermined recovery rate is maintained.

The process is continued until a steady state is reached or a predetermined concentration of contaminants is achieved in the retentate, also expressed as per cent recovery. The recovery rate or per cent recovery is defined as the ratio of permeate obtained per unit volume of feed multiplied by 100 or as shown in the following equation.

% Recovery=(Permeate Rate/Feed Rate)×100

In any case, the filter then is cleaned. The filter is renewed by flowing ozone continuously on line through the ceramic element. The ozone contacts the ceramic element membrane surface. The composition of the ceramic support and membrane layers can withstand such harsh cleaning without sacrificing its essential characteristics, which are high permeability to water, exceptionally good chemical resistance properties, and an ability to preserve the pore structure intact.

Referring now to FIG. 4, a schematic diagram is shown of a portion of the ceramic element 43 used in accordance with the process and apparatus of the present invention. Ceramic element 43 includes ceramic support 45 of alpha-alumina which has multiple channels 47 incorporated in monolithic support material. Channels 47 can be 3, 4, 6, or 7 mm in diameter and can be present in multiple number, such as the nineteen channel element depicted in FIG. 4. A one-channel element also can be provided as well as a thirty-seven channel element. A membrane layer 49 of metal oxide coating preferably is formed on the inside of axially oriented channels.

Ceramic support 45 is preferably an alpha-alumina, multilayer support although other support materials such as iron oxide, titanium oxide, zirconium oxide, zeolite (alumina/silica oxide), and silicon oxide can be used. The alpha-alumina support is a multi-layer structure comprising one or more sublayers, e.g., such as a sublayer of 0.2 micrometers pore diameter preferably about an average of 20 micrometers thick. The membrane layer 49 is further supported on a second sublayer, e.g., of about 0.8 micrometers pore diameter of about an average of 40 micrometers thickness, on the other side of the first sublayer. This structure then is further supported on a porous support which has a pore diameter of about 10 to 15 micrometers and a thickness of about 1.5 to 2 mm. The above ranges are exemplary in nature and thinner membranes and supports can be used.

Membrane layer 49 is preferably made of a sintered zirconium oxide optionally with yttrium oxide as a stabilizer. Other metal oxide particles which can be employed as the membrane layer in the invention, either singly or in mixtures thereof, include sintered zirconia, titania, or alpha-alumina (alpha-alumina for applications requiring nominal pore sizes of the membrane of about 0.2 micron and above) or other sintered metal oxides which provide the characteristics required in the apparatus and process of the present invention and which are capable of withstanding aggressive and extreme pH of alkaline or acid or strong chemical oxidants such as ozone at elevated temperatures.

In one aspect, the apparatus and process of the present invention include using a ceramic support and sintered zirconium oxide membrane controlled to have nominal pore sizes of less than about 200 Angstroms (20 nanometers). By controlled nominal pore size is meant establishing an average pore size, e.g., such as about 200 Angstroms, including more than about 95% of the pore sizes within the range of about plus or minus 5% of the nominal pore size, e.g., such as plus or minus 10 Angstroms in the case of a 200 Angstroms nominal pore size. In one embodiment, the nominal pore size of the zirconium oxide membrane on the support of the present invention is about 200 Angstroms, thereby providing higher flux.

Raw materials for the outer coating of the membrane include zirconium oxide stabilized with yttrium oxide. These raw materials are mixed with water or alcohol and a suspending agent to form liquid suspensions called slips. The slips are deposited onto the support and are heated to drive off the liquid medium, to burn off the suspending agent, and to sinter the membrane.

Slip preparation from the yttrium oxide-stabilized zirconium oxide begins by mixing the $ZrO_2$ powder with water and organic additives to form a homogeneous suspension. The organic additives, polyvinyl alcohol, and ethanol act as deflocculating agents and also help to adjust the rheological properties of the slip. They are evaporated or burned off later in the manufacturing process. The suspension then is diluted with water.

The slip prepared by the above method next is allowed to flow over the support where it is deposited and dried. The newly-formed layer then is subjected to a heat treatment in an oxidizing atmosphere which removes excess water and alcohol. The heat treatment also oxidizes the organic additives and sinters the $ZrO_2$ particles, thereby fusing them to each other and to the support. Maximum temperatures during the heat treatment vary with the pore diameter desired for the final product, but preferably the temperatures reach at least 500° C. to ensure all organic additives have been oxidized.

The present invention includes passing a feed 51 of ultra pure water 53 containing particles 55 through the ceramic element 43 in a cross-flow or tangential flow over membrane layer 49. By cross-flow or tangential flow, feed 51 can be channeled essentially perpendicular to the flow of the permeate 57 through support 5 and separated from retentate 59 as shown in FIG. 4.

In one embodiment, a specific membrane on support for the apparatus and process of the present invention can be provided by United States Filter Corporation/Ceramic Membranes Products Division having an office at 181 Thorn Hill Road in Warrendale, Pa. The U.S. Filter membrane is referred to as a zirconia ultrafilter.

The separation process involves complete removal from permeate 57 of particles, colloidal and suspended, including bacterial debris, if any.

The following actual example illustrates the membrane and method of the present invention as providing superior results over prior art processes.

EXAMPLE

Figure 5:
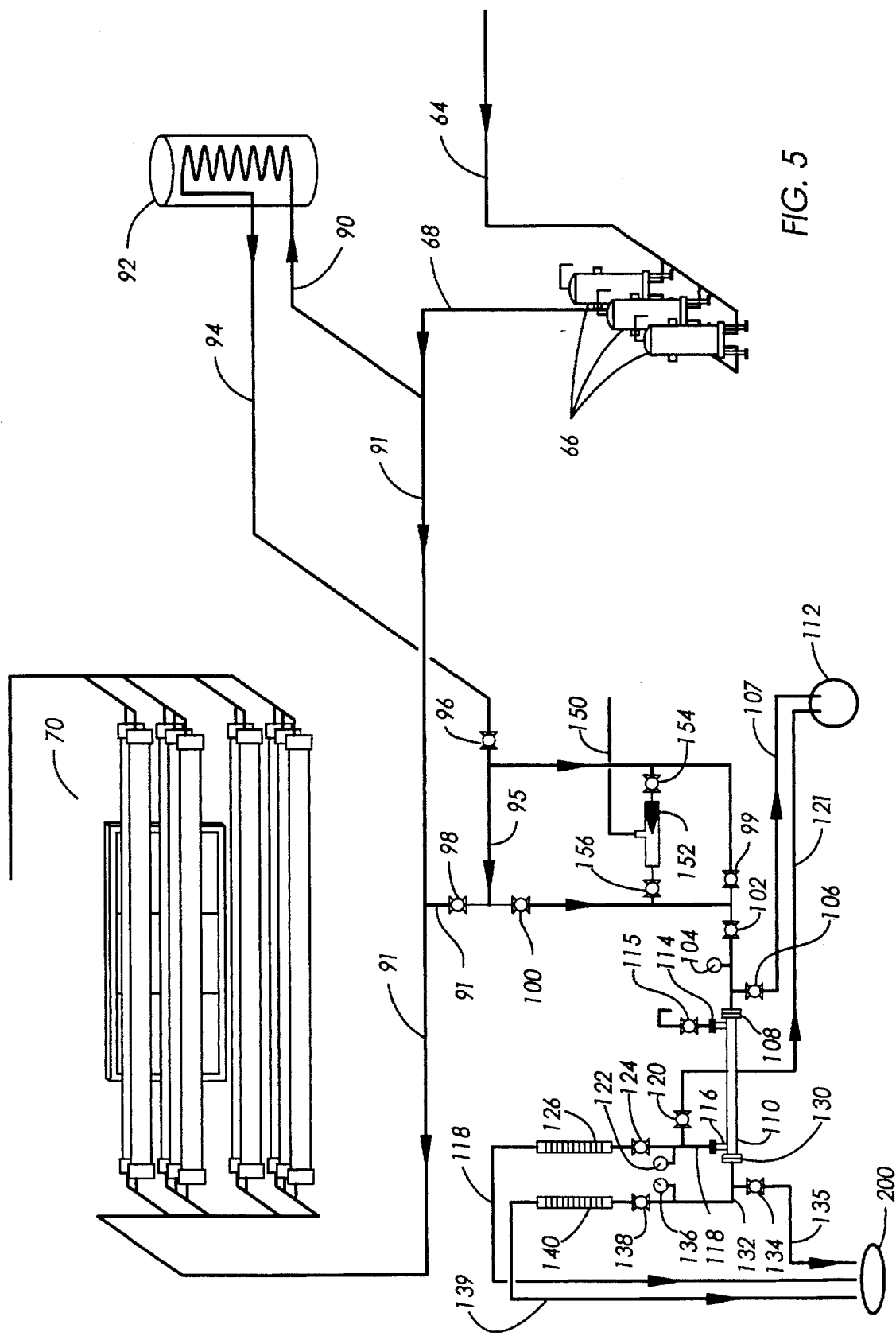
FIG. 5 is a process schematic diagram of a experimental testing system for comparing the prior art with ultra pure water filtration in accordance with the present invention.

The objective of this actual example was to determine whether or not there was any compatibility of an alumina-supported zirconia membrane with ultra pure water. A pilot scale unit operation depicted in the schematic of FIG. 5 was carried out incorporating a polysulfone prior art ultrafiltration system and a 200 Angstrom zirconium oxide sintered multichannel membrane on alpha-alumina support sealed into a separation membrane module. FIG. 5 is a process schematic diagram of the experimental testing system comparing the prior art with a process for filtering ultra pure water (UPW) in accordance with the present invention. Ambient UPW was supplied to the element housing through valves. Feed water data were gathered from a pressure gauge, and a sample valve supplied water to be tested to on-line analytical equipment. Feed water entered the housing through the inlet port. Air was vented from the housing through a vent port and valve. Permeate exited the housing through an outlet port. A valve supplied water to be tested to the on-line analytical equipment. Permeate pressure was indicated by pressure gauge. A valve was utilized for permeate isolation with a flow meter for flow totals and drain line taking all permeate to a waste drain. Retentate exited the housing through an outlet port. A valve was utilized for the purpose of fast flush to drain. Retentate pressure was indicated by pressure gauge. A valve for retentate isolation was provided with a flow meter for providing for flow totals and a drain line taking all of the retentate to a waste drain.

For hot UPW, ambient UPW was supplied to the heat exchanger. From the heat exchanger, hot UPW was supplied to the element housing.

For ozonated UPW, hot or ambient valves were opened allowing water to pass through the eductor drawing in ozone.

Sampling of the ultra pure water and the analysis work was performed by an independent laboratory (Balazs Analytical Laboratories located in Austin, Tex. and Sunnyvale, Calif.) to show that the filter was not adding any measurable contamination.

Referring now to FIG. 5, water exiting ultrafilter prefilter 66 in line 68 was fed (1) in stream 90 supplied to heat exchanger 92 and (2) in stream 91 to valve 98 or to polysulfone prior art ultrafiltration system 70.

Heat exchanger 92 increased feed water temperature by about 50°–150° degrees F. As needed, hot ultrapure water was fed from heat exchanger 92 through line 94 to valve 96 and to lines 95 each containing the same water characterization. Valves 99 and 100 were isolation valves located between lines 95 and were used to provide proper flow conditions. Valve 102 on line 95 supplied ultrapure water, either hot from line 95 or ambient from line 91, to ceramic membrane module 110 through housing inlet port 108. Pressure indicator 104 measured feed water pressure. Sample valve 106 supplied feed water samples in line 107 to on-line analytical equipment 112. In the experimental mode, housing 110 had port 114 used as a vent port to vent air or water from the test system through valve 115.

Housing port 116 was used as a product port supplying product water through line 118 to valve 120. Valve 120 supplied product water samples to on-line analytical equipment 112 through line 121. Water in line 118 is passed to pressure indicator 122 for providing product water pressure data, then through valve 124 as an isolation valve on line 118, and finally through product water flow meter 126 before passing in line 118 to drain 200.

Housing port 130 supplied water in line 132 through valve 134 as a fast flush through line 135 to drain 200. Pressure indicator 136 provided retentate pressure of line 132. Water in line 132 was passed through isolation valve 138. Water from valve 138 was passed through retentate flow meter 140 and line 139 before going to drain 200.

Ozone was added to the test system through line 150 into eductor 152. Valves 154 and 156 were opened for ozone addition and valves 99 and 100 were closed.

When steady state was established in pressure, linear velocity of solution through the feed channels, and temperature, the permeate valve in the membrane module was opened, and a flux was established corresponding to a transmembrane pressure differential of approximately 5 bar. Operating parameters were logged twice daily over a four week period. The permeate valve then was closed. Virgin membrane flux and permeability were calculated and served as a baseline for determining membrane regenerability after cleaning, should fouling occur. Ambient temperature prefiltered deionized water was added to the feed tank until the final desired operating volume was attained. The valves then were configured to enable circulation of the water through the feed side of the process. The permeate valve was opened, and the water allowed to permeate the membrane at steady state conditions with the permeate solution being returned to the feed tank. Operations were continued for a period of four weeks to identify any long term membrane leaching or shedding.

After cleaning with ozone, clean water flux of the cleaned membrane was calculated and compared to the virgin membrane flux. Hydrogen peroxide was used as the primary cleaning agent during the study, taking 30% and blending it down to 10%.

Metal ions in the permeate were found to be almost negligible.

A 200 Angstrom sintered zirconia ultrafiltration membrane on alpha alumina support was observed to filter at a level as reported in the Tables. Flux values with the 200 Angstroms zirconia membrane were observed to be acceptable. Particles were 100% retained at lower transmembrane pressures.

Operating parameters to determine whether fouling was taking place were recorded. Also recorded were data to show the rinse-up characteristics of the filter. During the four week study, the element was not back-pulsed, and no fouling of the element was reported as developing. However, daily fast flushes were run where the waste valve was opened to increase the velocity across the membrane surface. The same method was utilized for the polymeric membrane system.

It is important to note that the membrane element and housing were shipped separately to prevent shipping damage and the element installed into the housing at the test site in a non-clean room environment. The assembled module was then placed within the test system. The test system (piping and element) then underwent a cleaning for particles and biomatter with a 10% hydrogen peroxide (30% MB Grade $H_2O_2$ blended with ultra pure water) solution before going on line.

Ceramic element characteristics are shown in Table I.

TABLE I

| ELEMENT CHARACTERISTICS | |
|---|---|
| Model No.: | P19-40 with 0.2 m$^2$ of surface area |
| Membrane: | Zirconia 200 Å pore size |
| Membrane Support: | Alpha alumina matrix (12 to 15 micrometers) |
| Permeability: | 400 L/hour per m$^2$ per bar $\Delta P$ (evaluated model P19-40 with 0.2 m$^2$ of membrane surface area yielding 80 L/hr per bar $\Delta P$) |
| pH Capabilities: | Alpha alumina: 0–14<br>Zirconia: 0–14 |
| Operating Temp.: | 215° C. Limited only by gasket materials |
| Operating Pressure: | 120 psi standard modules, higher pressure modules available |
| Burst pressure: | Limited by the maximum housing pressure |

For the purpose of challenging the ceramic element under normal operating conditions over a four week experimental period, the element was set up to operate at conditions close to normal design parameters (model P19-40 with 0.2 m$^2$ of surface area yielding at least 80 L/hr per bar $\Delta P$). Throughout the course of this actual example, the ceramic element gave no indications of degradation to mechanical, structural, or final product water quality. The performance held constant with no significant decline in permeation rate.

Inlet pressure to the membrane averaged 94 psi during the study with a minimum pressure of 90 psi and a maximum of 100 psi being recorded.

Trans-membrane pressure ($\Delta P$) averaged 72 psi (about 5 bar) during the study with a minimum differential pressure of 68 psi and a maximum of 77 psi being recorded.

The recorded product flow rate averaged 7.6 L/min. during the example with a minimum flow rate of 7.6 L/min.

and a maximum of 8.0 L/min. It should be noted that the sample port for the on-line analytical instruments was upstream from the product flow meter and therefore not represented in the product flow data. The average flow rate to the analytical instruments during this example was recorded to be 271 mL/min.

Waste flow rate averaged 1465 mL/min. during the example with a minimum flow rate of 1420 mL/min. and a maximum of 1600 mL/min. being recorded.

The recoveries per pass rate averaged 81% with a minimum of 80% and a maximum of 82%. The recoveries per pass rate calculations take the analytical instrument flow rate into account.

Particles (On-line): Particle Measuring Systems (PMS-Boulder, Colo., USA): Micro LPS-PB with LVP-0.5 measuring cells. At start up, the PMS indicated 135 particles/L at 0.5 pm and within 8 hours had rinsed to 10 particles/L at 0.5 µm. The data indicated an average count of 3 particles/L at 0.5 µm during the example. During this example, the analyzer was set to a sampling volume of 0.2 L. At this setting and with this sensitive instrument, a comparison of very low particulate ultra pure water systems is not possible. On-line particle counters would provide higher sensitivity.

Total Oxidizable Carbon (TOC) On-line (Ariatel Corp.-Boulder, Colo. USA): Model A-100P. Anatel rates this instrument as having a dynamic range down to 10 ppb. However, experience with the meter shows it to be equivalent to the more sensitive Model A-100P SE in side by side comparison. The Model SE was calibrated to a 1 ppb standard before this example was started. The TOC at start up was recorded (by the A-100P) to be 4.9 ppb and within 4 hours had rinsed to 2.1 ppb. The data indicated an average TOC level of 0.65 ppb during the example. For comparison, the polysulfone filter initially had a TOC reading of 1600 ppb.

Resistivity: Thornton Model 822-A01 controller with model 211 cell. This system is not National Institute of Science and Technology (NIST) traceable. Therefore, it was only used to provide trending data. The initial resistivity reading was 4.5M-ohm/cm lower than the final reading. Within 4 hours, the reading had increased to 1.2M-ohm/cm lower than final reading. Within 16 hours, resistivity had rinsed to 0.5M-ohm/cm lower than final. The final resistivity was reached within four days. The final resistivity was approximately 18.2 megohm/cm because of the lack of charged species found in the product water.

The third party tests for contamination were performed as follows:

TRACE METALS: Balazs method using SCIEX/Perkin-Elmer Inductively Coupled Plasma/Mass Spectrometry (ICPR1lS) equipment modified for lower detection limits. This test used the low level boron option. The first contamination concern was zirconium, yttrium, or aluminum leaching because of the construction material of the membrane. Therefore, more trace metal data were taken than any other type of off-line analytical data.

TOC (Off-line): Balazs procedures using O. I. Instrument equipment. The sampling procedure exposes the sample to air which allows for probable contamination at this low TOC level. Higher TOC data were obtained at other times, but are not reported here.

PARTICLES by Scanning Electron Microscope (SEM): Balazs Method using Cambridge Scientific Model. Data from SEM can be highly dependent on the sample volume. Data reported is from samples taken with the most similar sampling volumes. Because of concerns about analytical filter integrity, SEM data was not taken for the hot ultra pure water tests.

The precision information supplied by Balazs is based on the sample volume passed through the analytical filter, the number of particles counted and the fraction of the analytical filter examined. The actual precision of the analysis will be worse than reported. Random factors including the number of particles added to the filter during sampling and the number of particles on the filter (as supplied) cannot be accounted for in the precision calculations.

BACTERIA by culturing: Balazs modified ASTM method with a 1 L sample size using Millipore Sterile Sampling Valves. Bacteria data are reported in colony forming unit (CFU) per 100 mL.

SILICA: Balazs molybdate complexing methods. Non-dissolved or colloidal silica is calculated by subtracting the dissolved (reactive) silica from the total silica.

IONS: Balazs methods using Dionex ion chromatography equipment. The lower detection limit used for the ultra pure water guidelines was not available during this example.

The Balazc guidelines do not specify concentrations for all metals tested. All shaded data in the trace metal portion of the table are for specified metals.

Other trace metal data given here are current ICP/MS detection limits except as noted below. Several complete sets of analytical tests were performed at both room and 54° C. temperature. Boron analysis is by low detection limit method. A 0.01 ppb detection limit for iron was available but not used for this testing.

Tables II and III present a compilation of results from this actual example.

Table II provides analytical data relating to trace metals measured in the product water stream of the present invention.

TABLE II

TRACE METAL ANALYSIS

| Metal | Detection Limit ppb | Measured ppb |
|---|---|---|
| Aluminum (Al) | 0.007 | — |
| Barium | 0.002 | — |
| Boron (B) | 0.3 | 0.25 |
| Chromium (Cr) | 0.008 | — |
| Copper (Cu) | 0.005 | — |
| Iron (Fe) | 0.01 | <0.1 |
| Lithium (Li) | 0.004 | — |
| Magnesium (Mg) | 0.002 | 0.004 |
| Manganese (Mg) | 0.004 | — |
| Nickel (Ni) | 0.005 | — |
| Sodium (Na) | 0.007 | — |
| Strontium (Sr) | 0.002 | — |
| Yttrium (y) | 0.005 | — |
| Zinc (Zn) | 0.008 | — |
| Zirconium (Zr) | 0.005 | — |

Although there was an initial concern based on the best available engineering regarding some trace metals because of the production method of the present invention, Table II shows that aluminum, yttrium, and zirconium were not found above the detection limits of the analytical equipment. Based on the experience and the professional opinion of the independent laboratory conducting the test, the contamination which was detected above the detection limits was atmospheric contamination picked up by the water during the time of sample collection.

Table III provides analytical data comparing items measured in the product water stream of the present invention to established Pure Water Guidelines.

TABLE III

ULTRA PURE WATER CHARACTERISTICS

| | Balazs 1993 UPW Guidelines (11) | Membralox® 0.02 μm |
|---|---|---|
| Resistivity M ohm/cm @ 25° C. | 18.2 | n/a |
| TOC ppb | | |
| Off line | <10.0 | 5.0 |
| On line | <1.0 | 0.7 |
| Particles/L (SEM 0.1μm) | | |
| 0.10–0.20 μm | <200 | 137 ± 56 |
| 0.20–0.50 μm | <100 | 84 ± 41 |
| 0.50–1.00 μm | <1 | 39 ± 22 |
| >1.00 μm | <1 | 36 ± 23 |
| Volume Sampled | | 3168 |
| Particles/L (on line) | | |
| 0.05–0.1 μm | <100 | n/a |
| 0.1–0.20 μm | <50 | n/a |
| 0.2–0.30 μm | <20 | n/a |
| 0.3–0.50 μm | <10 | 0.7 avg. |
| >0.50 μm | <1 | 0.11 avg. |
| Bacteria (by culture) | | |
| cfu/100mL | <0.1 | <0.1 |
| Silica/ppb | | |
| Dissolved | <0.2 | 0.2 |
| Non-Dissolved | <0.5 | 0.5 |
| Total | <0.5 | 0.7 |
| Ions/ppb (by Ion Chromatography) | | |
| Cations | | |
| Lithium Li$^+$ | | <0.05 |
| Sodium Na$^+$ | <0.01 | <0.05 |
| Ammonium NH$_4^+$ | <0.06 | <0.1 |
| Potassium K$^+$ | <0.02 | <0.1 |
| Anions | | |
| Fluoride F$^-$ | <0.1 | <2.0 |
| Chloride Cl$^-$ | <0.02 | <0.05 |
| Bromide Br$^-$ | <0.02 | <0.1 |
| Nitrate NO$_3^-$ | <0.02 | <0.1 |
| Nitrite NO$_2^-$ | <0.02 | <0.05 |
| Phosphate HPO$_4^-$ | <0.02 | <0.1 |
| Sulfate SO$_4^-$ | <0.05 | <0.1 |

The tests were performed utilizing the best available technology during the time the study was conducted. The following provides a brief description of those findings. Resistivity was not reported because the instrument utilized to collect this data was not NIST traceable and was used only for reference. During this actual example, no drop in water quality was detected. TOC off line detected no drop in water quality. TOC on line noted an improvement in the initial TOC levels when compared to the initial TOC levels of the polymeric membrane system. No drop in water quality was detected. As to Particles by SEM, the independent laboratory reported excellent results. It is their opinion, based on experience, that the results would even improve had higher sample volumes run through the SEM filters to provide better resolution. As to Particles by On-line Detection, the independent laboratory reported excellent results. During the actual example, no drop in water quality was detected. As to Bacteria by Culture and Ions by Ion Chromatography, the independent laboratory reported excellent results. During the actual example, no drop in water quality was detected.

Tests were performed utilizing the best available technology during the time the actual example was conducted.

The data presented in the Tables show very little, if any, difference between the ceramic filter and the polysulfone filter. The dissimilarities shown are not greater than the uncertainty of the test measurements associated with the analyses. The variability between particle counts by SEM for the ceramic filter and the polysulfone fit into that category. In fact, the contrast between the SEM counts for the two filters and the Balazs specification also fit into that category.

The ceramic filter did not show any sign of degradation or any other operational problems during this test. The total permeate flow was slightly higher than specification (7.8 L/min. total flow at 72 psi compared to 6.4 L/min. specified).

In the area of filter cleanliness, the only significant difference between filters is that the initial TOC for the ceramic filter element was significantly lower than the initial TOC for the polysulfone filter element. Rinse-up characteristics of the ceramic filter were quite positive compared to experience with other filters.

The distinction between the silica data for the two filters was small. The data also were close to the detection limits such that no difference exists in silica retention.

The ceramic filter tested appeared suitable for use in semiconductor ultra pure water systems in respect to cleanliness at both room and elevated ultra pure water temperatures. The ceramic filter did not contribute measurably more particles than the conventional polysulfone filter. It also did not plug or foul when operated in the same way as the polysulfone membrane.

A 200Å multichannel monolithic cross-flow 1P1940 element through a test protocol which included on-line TOC analysis, particle count, resistivity measurements, and trace metal analysis performed after two days of running and then after five days of operation at Batazs laboratories to determine extractables from the ceramic elements.

The system was operated at 83% recoveries per pass and at very low cross-flow velocities since the water has been through an RO filter and then deionized before entering the multichannel monolithic cross-flow system. The industrial interest in this application relates to the need to replace polymeric 10,000 MW ultrafiltration systems with a membrane that can tolerate both ozone and high temperature if necessary.

The module for this application extended the rinse up of the module at startup. It took about a week to rinse out the TOC components from Viton gaskets, and particle counts were slow to reach zero.

It is recommended that the housings and gaskets should be rinsed before installing them into the housing in a clean room environment. It is recommended then to cover or bag the housings with particle-free bags and should realize a one day rinse up to operation.

The current representative operational parameters for the system are as follows:

Pressure in: 90 psig
Pressure out: 89 psig
Permeate back pressure: 25 psig
Temperature: 80 ° F.
Feed flow: 2.51 gpm
Permeate flow: 2.08 gpm
Concentrate flow: 0.43 gpm
Fast Flush frequency: 2.5 gpm/every 8 hrs. for 5 min.

The Table II trace metal analysis sheets show some sodium leakage from their IX columns. Boron was primarily coming from the feed water and was in line with the existing water system results, and Magnesium was unexplained. Particle counts were zero, and the TOC on-line analyzer indicated that the permeate from the ceramic membrane was identical to the existing water system quality.

The need for extremely clean water in the production or manufacturing of electronics components or semiconductors has always been an important issue, and it will continue to be an important issue far into the foreseeable future. Each ultra pure water facility in operation today must be scrutinized to identify areas of improvement in system operation and quality that can be made now so that the stringent manufacturing needs of tomorrow can be met. The present invention is a result of current developments underway in researching improvements in the filtration of ultra pure water and documenting comparisons between different filter media.

Thus it can be seen that the invention accomplishes all of its objectives.

Although the invention has been illustrated by the preceding actual examples, it is not to be construed as being limited to the materials employed therein.

Whereas particular embodiments of the invention have been described hereinabove, for purposes of illustration, it will be evident to those skilled in the art that numerous variations of the details may be made without departing from the invention as defined in the appended claims.

The apparatus and process of the present invention are not limited to the descriptions of specific embodiments presented hereinabove, but rather the apparatus and process of the present invention should be viewed in terms of the claims that follow and equivalents thereof. Further, while the invention has been described in conjunction with several such specific embodiments, it is to be understood that many alternatives, modifications, and variations will be apparent to those skilled in the art in light of the foregoing detailed descriptions. Accordingly, this invention is intended to embrace all such alternatives, modifications, and variations which fall within the spirit and scope of the appended claims.

What is claimed is:

1. A process for separating particle contaminants from ultra pure water in a feed solution containing ultra pure water and particle contaminants comprising:

(a) passing a feed of corrosive, high purity water by cross-flow filtration through a sintered monolithic metal oxide membrane on ceramic support to form a permeate of ultra pure water; and (b) passing on-line ozone as part of said feed cross-flow through said metal oxide membrane on ceramic support.

2. The process of claim 1, wherein said on-line ozone comprises ozone in a concentration of at least about 1 ppm.

3. The process of claim 2, wherein said passing on-line ozone is carried out at an elevated temperature higher than about 80° C.

4. The process of claim 3, wherein said corrosive, high purity water feed comprises less than about 0.5 PPB aluminum.

5. The process of claim 4, wherein said membrane on ceramic support comprises a multichannel porous sintered zirconium oxide on ceramic support having a nominal pore size range greater than about 50 Angsttoms and less than about 500 Angstroms.

6. The process of claim 5, wherein said permeate comprises less than a detectable level of metal ions.

7. The process of claim 6, wherein said permeate comprises less than a detectable level of aluminum ions.

8. The process of claim 1, wherein said metal oxide membrane has a nominal pore size of about 50 to 220 Angstroms.

9. The process of claim 8, wherein said cross-flow filtration comprises maintaining a recoveries per pass rate of at least about 80% and a transmembrane pressure differential less than about 10 bars.

10. The process of claim 9, wherein said cross-flow filtration comprises maintaining a transmembrane pressure differential less than about 6 bars.

11. A process for filtering ultra pure water, comprising passing a feed of corrosive, high purity water containing organic macromolecule particles cross-flow through a sintered monolithic metal oxide membrane on ceramic support to form a permeate of particle-free ultra pure water, wherein said feed further contains ozone.

12. The process of claim 11, wherein said ozone comprises an ozone concentration of at least about 1 ppm at an elevated temperature higher than about 80° C.

13. The process of claim 12, wherein said metal oxide membrane on ceramic support comprises a porous sintered membrane consisting of zirconia or alpha-alumina having multiple axially oriented channels through which said feed can pass.

14. The process of claim 13, further comprising passing ozone cross-flow through said metal oxide membrane on ceramic support to sterilize and regenerate said metal oxide membrane on ceramic support.

15. A process of removing particles from water, comprising (a.) passing corrosive ultra pure water containing particle contaminants through a metal oxide membrane on a ceramic support to form a permeate of particle-free ultra pure water;

(b.) passing on-line ozone with said corrosive, ultra pure water cross-flow through said metal oxide membrane on ceramic support to regenerate said metal oxide membrane continuously; and (c.) using said permeate to produce high purity hydrofluoric acid for use as an etchant in electronics manufacturing.

16. The process of claim 15, wherein said particle contaminants are materials selected from one or more of the group consisting of (i) bacteria less than 10 per ml, (ii) colloidal particles, (iii) pyrogens less than 10 eu (endotoxin units) per ml, and (vi) mixtures thereof.

17. The process of claim 16, wherein said particle contaminants are organic macromolecules.

18. The process of claim 17, wherein said passing said used water through a metal oxide membrane comprises cross-flow or tangential flow over said membrane at recoveries per pass rate of at least about 80%.

19. The process of claim 18, wherein said recoveries per pass rate is at least about 90%.

20. The process of claim 19, wherein said metal oxide membrane is selected from the group consisting of zirconia, titania, silica, and alpha-alumina.

* * * * *